Jan. 10, 1950 W. A. ANDERSON 2,493,799
LOAD EQUALIZING FOR DIFFERENTIAL ACTUATORS
Original Filed June 27, 1946 2 Sheets-Sheet 2
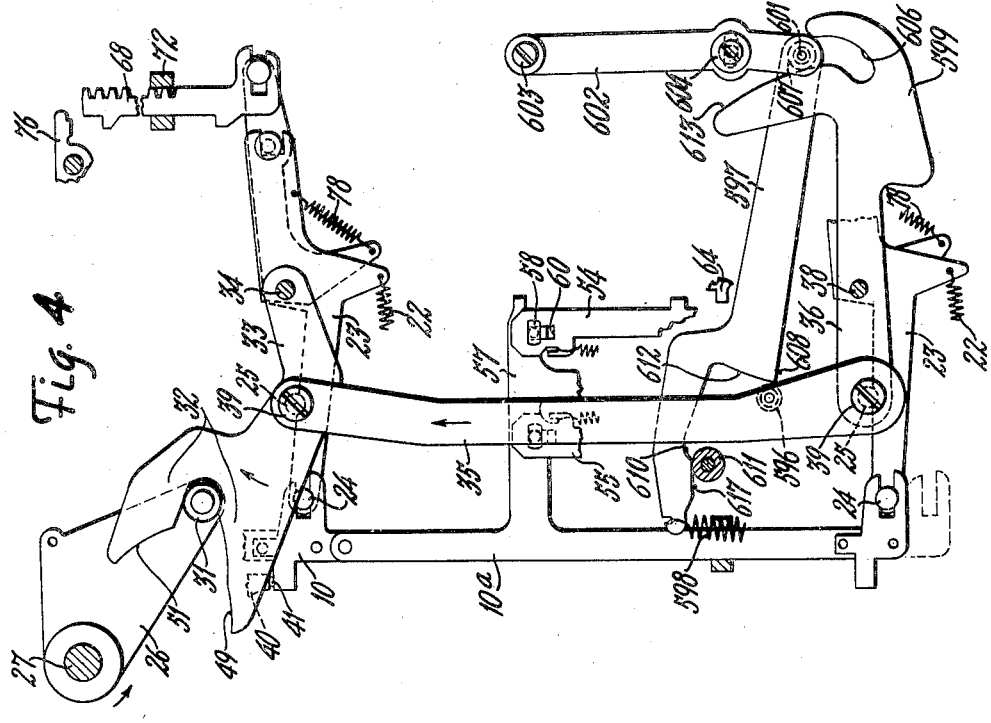
Inventor
WALTER A. ANDERSON
By Jesse A. Holton
Attorney Patented Jan. 10, 1950

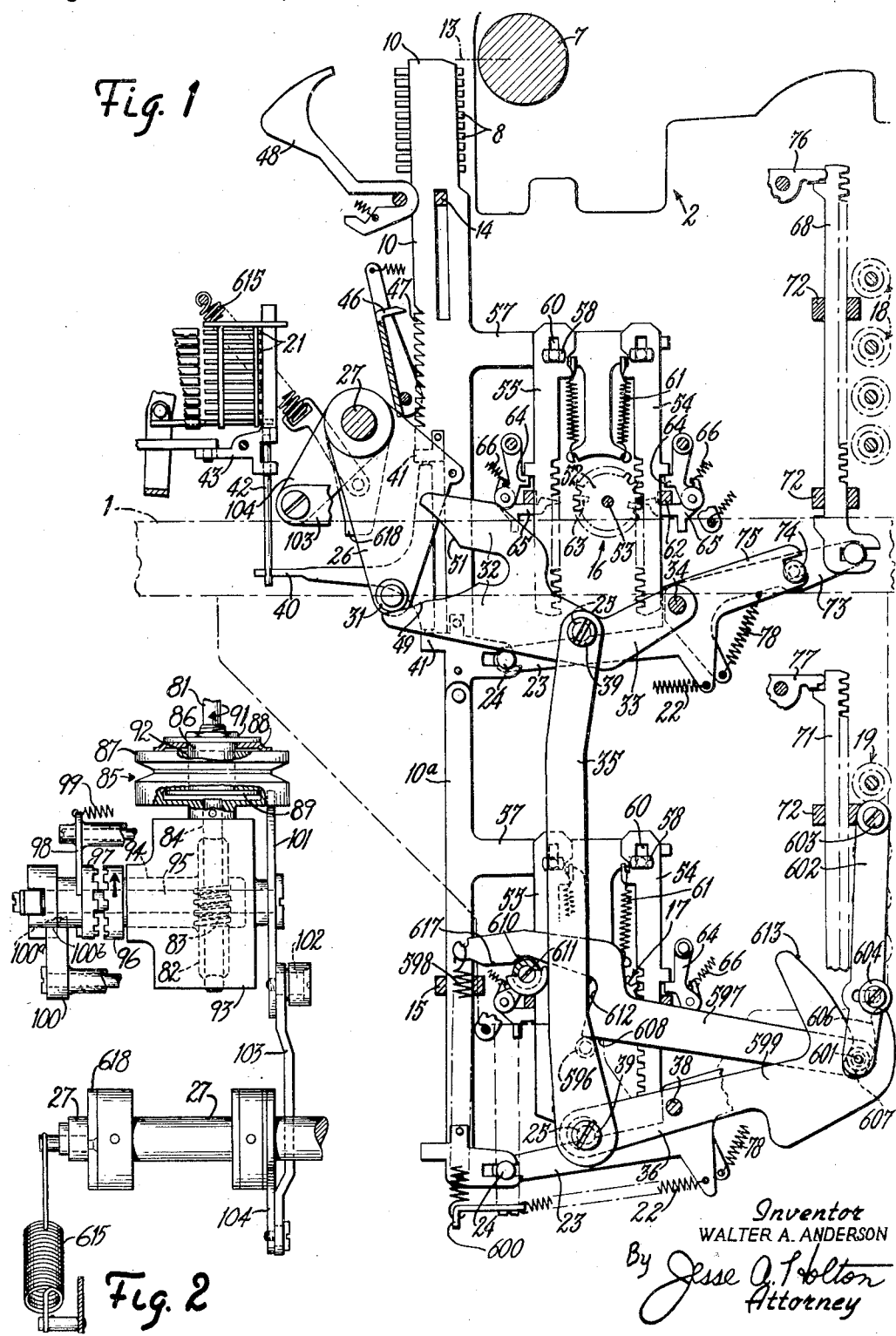

2,493,799

UNITED STATES PATENT OFFICE 2,493,799

LOAD EQUALIZING FOR DIFFERENTIAL ACTUATORS

Walter A. Anderson, Bridgeport, Conn., assignor to Underwood Corporation, New York, N. Y., a corporation of Delaware Original application June 27, 1946, Serial No. 679,722. Divided and this application June 24, 1948, Serial No. 35,039

9 Claims. (Cl. 235—60)

This invention relates to adding and accounting machines in general, and more particularly to improvements in mechanisms for actuating registers in such machines.

The subject matter covered constitutes a division of application No. 679,722, filed June 27, 1946.

In some adding and accounting machines springs transmit or provide the power for carry-over or transfer operations from lower to successively higher orders. These springs are idly stressed at an end-phase of each machine cycle, in all those denominational orders which are not to receive a carry-over unit from the next lower order. Usually there occur only carry-over operations in a few orders. Therefore, an unusually heavy and sudden extra load is placed on the cycling mechanism at the end-phase of the cycle. This is particularly so if the machine includes a plurality of registers, and when several of such registers are simultaneously active. The same springs when not effecting transfer operations are collectively exerting a strong driving force on the machine cycling mechanism at the beginning of each cycle, and have been found to jerk and jar certain parts of the machine cycling mechanism out of step with parts intended to be controlled thereby, resulting in faulty operation of the machine and faulty calculations.

Moreover, sudden and great load changes have been the cause of excessive jarring of parts, abnormal stresses, excessive wear of parts, excessive noise, and objectionable vibration.

Also, the conditions stated have made it impractical to provide an overload clutch capable of performing its intended function at all phases of the machine cycle.

With regard to the above difficulties it is a broad object of the invention to provide in a machine embodying transfer devices of the above type, efficient means to render the cycling load more nearly uniform throughout the cycle.

Another object is to provide for a transitory effectiveness of a force counteracting that of the collective force exerted by the transfer springs in the portions of the machine cycle wherein said transfer springs are affecting the cycling load.

Another object of the invention is to embody in a machine of the type stated, an efficient provision to hold the cycling load to a minimum, substantially free of sudden load changes, and sufficiently constant for rendering the machine suitable for employment of an overload clutch that will function satisfactorily at all phases of the cycle.

It is an object also to provide efficient and simple transitorily active means to counteract at least in part a tendency of transfer actuating springs to drive register wheels and associated type bars too fast during the initial phase of each machine cycle.

Also it is an object to have said counteracting means work substantially without placing any added load and stress on the machine cycling parts during any phase of the cycle.

In addition to the above specifically noted objects, the invention has many other objects which are in part obvious and in part pointed out specifically as the description of the preferred embodiment of the invention proceeds.

The invention has been worked out and is illustrated and described as embodied in the well-known Class D Sundstrand accounting machine, the main conventional features of which are disclosed in the patents to Sundstrand, Nos. 2,194,270 and 2,209,240, dated respectively, March 19, 1940 and July 23, 1940. Reference to this machine and to these patents may be had for clarification of features and details which are not directly part of the present invention and which it is not deemed necessary to describe and illustrate.

In the accompanying drawings:

Figure 1 is a right-hand sectional side elevation, illustrating in normal position the major parts of the printing and computing devices of the machine, inclusive, a novel spring device for counteracting the power of carry-over springs during certain phases of the cycle, Figure 2 is a fragmentary plan view illustrating portions of the machine cycling drive, Figure 3 shows a portion of the mechanism seen in Figure 1 in the position it assumes when a cycle has been started and the type-bars have been allowed to rise a short distance. The view shows the novel counteracting spring device of Figure 1 being shifted to ineffective position. The same position of the parts is transitorily reached near conclusion of the return stroke of the cycle, Figure 4 is a view similar to Figure 3, but the cycle has progressed along further and the spring device of Figures 1 and 3 has been placed in an idle, energy-storing condition, not resisting the progress of the cycle.

*Old Sundstrand accounting machine features*

Referring now more particularly to Figure 1, the machine comprises a paper supporting carriage 2 provided with a customary platen roller 7 which serves to support work-sheets for receiving impressions from amount-printing types 8 carried on a series of laterally adjacent type-bars 10. The said type-bars 10 are supported in a stationary section 1 of the machine, as at 14 and 15, for differential, vertical sliding movements from retired positions below a typing line indicated at 13, as seen in Figure 1 to various raised positions, presenting the proper types 8 in front of said typing line 13. The type-bars 10 have associated therewith an upper and a lower main register respectively numbered 16 and 17, each, as usual, capable of addition as well as subtraction. These registers 16 and 17 henceforth will be referred to as crossfooters. The said type-bars 10 have also associated therewith an upper and a lower group of plain adding registers, all disposed to the rear of the crossfooters, the registers in these two groups being respectively designated by the numerals 18 and 19.

In order to cause the types on the bars 10 to record amounts, usual numeral keys, not shown, are operated to set up proper stopping conditions in a field of stop-pins seen in Figure 1, thereby to predetermine the proper differential extents to which the type-bars 10, and downward extensions 10a for driving the crossfooter 17, are to rise under the tension of springs 22. There is one spring 22 for each type-bar 10, and one for each type-bar extension 10a, each spring 22 being associated with a lift arm 23 that is articulated with a type-bar or its extension, as at 24, at widely different elevations. Normally, as seen in Figure 1, the type-bars 10 are held in low, retired positions by two universal bars or members 25, each one overlying a gang of said lift arms 23, and both bars 25 being normally held against rising by the cycling mechanism of the machine, as will be evident later.

The cycling mechanism comprises two reciprocative crank arms 26, one at each side of the group of type-bars, and both fixed upon a main rock shaft 27 of the machine, and carrying rollers 31 that engage with forked ends 32 of two levers 33, said levers 33 carrying the upper restoring bar 25 and being pivoted upon a stationary rod 34 upon which also the type-bar lifting arms 23 are pivoted. Laterally spaced vertical links 35 connect the opposite cycle-controlled levers 33 with two laterally spaced arms 36 which support the restoring rod 25 for the lower lifting arms 23. Said spaced arms 36 and the lifting arms for the type-bar extensions are mounted on a common pivot rod 38. For simplicity of construction the said links 35 are pivoted to the arms 33 and 36 upon laterally extending ends of the universal bars 25, and are held thereto by the heads 39 of screws. If subsequently to indexing an amount in the keyboard, a machine cycle is instituted by the depression of a cycle key, not shown, the two crank arms 26 will move anti-clockwise as seen in Figures 3 and 4, and their rollers 31 will move rearwardly and upwardly and will cause the said levers 33 and 36 with their rods 25 to rise, thereby permitting the type-bars 10 to rise appropriate extents under the power of the springs 22, as predetermined by the stopping conditions established by the setting of the stop pins 21. To this end, each type-bar 10 has a forwardly reaching arm 40 hingedly attached thereto at a vertically disposed axis, as at 41. At their forward ends the arms 40 reach slidably into slots provided in rods 42, the latter of which are guided for vertical movement in a denomination shifting slide 43 which incidental to each digit indexed in the stop pins 21 moves one step laterally to align the rods in progressively correct denominational relationship with the bed of stop pins 21, as is clearly disclosed in the said patents to Sundstrand. It should be observed that the vertical rods 42 in moving stepwise with the slide 43, maintain their operative connections with the associated type-bars 10 by reason of said hinging connections 41. The type-bars 10 rise differentially to their appropriate digit or character-representing positions during the first half of the reciprocative cycling movement of the crank arms 26, and are forcibly restored against the tension of the springs 22 by the return reciprocation of the crank arms 26, at the end of which, as seen in Figure 1, the roller 31 has ridden onto a dwell 49. For this reason all the type-bars are normally locked against spring-urged upward movement. At the very beginning of the return movement of the crank arms 26, an aligner blade 46 moves transitorily into one of a series of detent notches 47 on the type-bars. The operating mechanism for the aligner blade is not shown. The types 8 which become located opposite the printing line are momentarily pushed against the platen by hammers 48 and these hammers are restored just before the return movement of the type-bar commences. Each of the rollers 31 engages another dwell 51 on the associated lever 33, at the end of the forward half of the cycle, and thereby provides for a delay in the return of the type-bars during which the type hammers 48 have time to operate and withdraw. The reason for the two sets of spring-urged lifting arms 23 and the two restoring bails 25 is to reduce the total necessary stress on any part of the type-bar and extension, thereby to prevent undue flexure thereof.

Each of the crossfooters 16 and 17 comprises a series of pinions 52 rotatably mounted upon a transverse shaft 53. These shafts 53 are mounted for movement fore and aft of the machine, and each of the two sets of pinions 52 is located between two sets of racks 54 and 55, the racks 54 being adding racks and the racks 55 being subtracting racks. The adding racks 54 and the subtracting racks 55 are respectively attached to rearward branches 57 of the type-bars 10 and their extensions 10a, by means of mounting studs 58 which reach from said branches through vertically elongated openings 60 in said racks. At the level of the crossfooters, the racks 54, 55 are guided in transversely slotted horizontal bars 62. Contractile springs 61 associated with said racks 54, 55, and anchored to downward reaches of said branches 57, facilititated by the openings 60, permit arrest of the racks 54, 55 when they have descended distances corresponding to the indexed amount digits, the type-bars 10 to which racks 54, 55 are attached, continuing the downward descent the equivalent of an extra unit for tens transfer purposes, it being understood that the total movement of the type-bars is always one unit in excess of the indexed amount or condition. Conventional automatic and manual controls are provided for causing engagement of the individual crossfooters with either of their associated sets of racks 54, 55 at the beginning of the second half cycle of the machine, to cause the type-bars, during their descent, to drive either or both said crossfooters, either additively or subtractively. Tens transfer blocking elements 64 are capable of arresting the racks 54, 55 after a descent corresponding to the indexed number, but when a register wheel is to receive a transfer from the wheel of the next lower order, a carry tooth 63 on such lower order wheel will trip a transfer control 65 to free it from an edge of the associated rack guiding bar 62, and thereby to cause the blocking element 64 in control of the rack 54 or 55 which is to receive the transfer, to move out of blocking position under the urge of a spring 66. In each instance where this occurs, the active rack 54 or 55 descends the full distance with the associated type-bar 10, or extension 10a, and will move the register wheel the equivalent of the indexed digit plus a carry unit. In all instances where there is to be no carrying operation, the blocking elements 64 will remain in place and the springs 61 will be stretched after the racks 54 or 55 have become arrested. It might yet be stated that at the end of each amount entering cycle the crossfooters which have been active remain engaged with their racks, pending an appropriate readjustment called for in the next machine cycle. This is conventional structure.

True positive and negative totals can be taken from either of the crossfooters in the conventional manner.

A common set of racks 68 serves to drive all adding registers 18, and another common set of racks 71 serves to drive all adding registers 19. The racks 68 and 71 are mounted for vertical movement in guides 72. At their lower ends, the various racks 68 and 71 have articulations with arms 73 that are pivotally mounted on the rods 34, 38 on which the aforesaid lifter arms 23 for the type-bars 10 and extensions 10a are respectively mounted. Each of the arms 73 has a loose connection 74 with an arm 75 which is integral with the type-bar lifter arm 23 of the appropriate order and forms therewith a lever, said loose connections affording some capacity for relative movement between the related arms 73 and 75. Thus when the type-bars 10 rise in accordance with the indexed digits, the racks 68, 71 will descend correspondingly. Conversely, as the type-bars descend during the second half cycle of the machine, the racks 68, 71 will rise. Conventional control mechanism is provided to condition the registers 18 and 19 selectively for engagement with their associated sets of racks 68, 71 at the beginning of the return stroke of the cycle, and to maintain the selected registers engaged for the remainder of the cycle, thereby to effect addition in any of these registers. The machine includes also control means for the taking and the printing of totals of the registers 18 and 19 as fully described in the aforementioned Patent No. 2,209,240. Under any circumstances only one register in each group is selectable at one time. This is because all registers in each group are served by a common set of carry-over controls, indicated for the upper registers 18 and the lower registers 19 respectively at 76 and 77. Springs 78 associated oppositely with the arms 73 and 75, facilitated by said capacity for relative movement between these arms, permit arrest of the racks 68, 71 when they have risen appropriate distances in accordance with the indexed amounts. The arrest of the individual racks 68, 71, occurs under control of carry-over controls 76, 77, such controls being capable to block the last-part upward movement of the racks at all times except in the instances where carrying operations are in order. As in the case of the springs 61 for the crossfooter driving racks 54, 55, the springs 78 are stressed during the last unit downward movement of the type-bars in all such instances where no carrying operations are to take place.

*Improved machine cycling mechanism, and control therefor*

It has been stated that the cycling mechanism includes two reciprocative crank-arms 26 on a rock shaft 27. The means by which the rock shaft 27 is given its cycling reciprocation will now be described. As in the structure disclosed in the above noted Patent No. 2,194,270, an electric motor, not shown, drives a worm wheel 82 at greatly reduced speed by means of a worm 83 formed on a spindle 84. However, in the present machine there is interposed between a shaft 81 of the motor and the worm-spindle 84 an overload slip-clutch generally designated by the numeral 85. Said overload clutch comprises a driver element 86, constantly motor-driven by the shaft 81, and another element 87, the latter fast on the spindle 84 and frictionally driven by the driver element 86. The driver element consists of a cylindrical rotor having two axially spaced flanges 88 and 89, the flange 89 being integral with the rotor element 86, and the flange 88 being made of springy material, formed as shown, and carried upon the rotor for rotation therewith, but axially adjustable to and from the other flange by means including a nut 91. The driven clutch element 87, has an annular section 92 between the flanges 88, 89 of the other element, tension being given the flange 88 by appropriate axial adjustment thereof so that both the flanges bear resiliently against the ends of the annular section 92. It follows thus that the clutch element 86 drives the clutch element 87 impositively through frictional contact. As will be evident later, this is for the purpose of softly picking up the load at the beginning of each cycle, and also to prevent injury to the machine should it become tied up for some reason or other. The impositiveness with which the clutch element 87 is driven provides also for impositive drive of mechanism other than the cycling mechanism, for example, a carriage return drive, not shown. The worm 83 and the worm gear 82 are both contained in a housing 93. The worm gear is integral with a tubular shaft 94 that is rotatively mounted on a shaft 95 and which, exterior of the housing 93, carries a toothed clutch element 96. Slidably splined on a shaft 95 for engagement with the clutch element 96 is a companion clutch element 97. A clutch shifter 98 under constant tension of a spring 99 tends to move the clutch element 97 into engagement with the other clutch element 96. However, as seen in said Figure 2, the clutch element 97 is normally held out of engagement with the clutch element 96 by a cycle trip dog 100, having a cam face 100a to cam the clutch element 97 to open-clutch position, and having also a shoulder 100b to hold this clutch element 97 against rotation. A fuller disclosure is made on this in said Patent No. 2,194,270. Said dog 100 is moved or tripped free of the clutch element 97 in response to each depression of a conventional cycle key shown in said Sundstrand Patent No. 2,194,270, and moves again into position before the shaft 95 has received a complete revolution, thus to restrict turning of the shaft 95 to one single revolution for each cycle trip. Each single revolution of the shaft 95 is translated into a single reciprocation of the shaft 27, as required for reciprocation of the type actuators 10, and for other purposes. Specifically, a crank disk 101 has a crank pin 102 to which is pivotally connected one end of a pitman 103, the other end of which has a pivotal connection with an arm 104 fast on the rock shaft 27. A harmonic motion reciprocation will thus be given the arms 26 in response to each depression of the cycle key. The machine provides also for operation of the cycle trip dog 100 under control of the carriage, in a manner described in said Patent No. 2,194,270.

*Improvement for load equalization during machine cycles*

It has been brought out that towards the conclusion of each machine cycle there are usually stressed a great number of springs 61, 78 which are associated with the drive racks of the crossfooters and rear registers to effect tens transfer operations under control of the blocking elements 64. Since tens transfers are usually only occurring with respect to a few register wheels, the aggregate upward force exerted by the strained springs at the beginning of each cycle is very considerable. In fact the force is so great that the type-bars or register actuators 10 have been found to jerk upwardly after the rollers 31 on the crank-arms 26 passed off the dwells 49 on the levers 33 at the very beginning of the machine cycle. This jerk was often so violent that the levers 33 and the cycling mechanism was driven in advance of the motor speed, with the result that in many instances the usual register engaging mechanism, as well as other mechanisms, failed to perform their assigned work properly. Aside from the above, the jerky, uneven action has been objectionable from the standpoint of machine wear and noise. Moreover, the load variation having been very great, it has been impractical to use successfully in the cycling drive an overload clutch such as the one earlier described and numbered 85.

It is old in the art to control the operating speed of reciprocating type-bars or register-actuators during certain phases of the cycle, but usually this has been accomplished by placing a load or strain on the machine cycling mechanism, and subjecting the machine to increased wear and tear.

According to the feature of the invention, there is applied to the type-bars or actuators 10, at the end of each machine cycle and for an initial part of the next cycle, a force that counterbalances at least in part the aggregate force that the transfer springs 61 and 78 exert on the type-bars at the end and at the beginning of each cycle. This force is preferably resilient in nature and is applied and removed under control of the cycling mechanism substantially without imposing any extra load on the latter.

To the above ends stated, the laterally spaced links 35, which connect the upper and lower type-bar restoring rods 25, carry each a roller 596. In the full cycle position of Figure 1 there bears normally upon each of these rollers a spring-load-shifter or link 597, each of which at its front end has connected thereto a strong, downwardly pulling spring 598. These springs are accorded anchorages as at 600 on the machine framework. Said links 597 are pivotally carried by pivot studs at their rear, as at 601, upon two spaced guide arms 602 that are pendant from pivotal supports 603 on the frame for swinging movement fore and aft. They are guided for swinging movement at lower points by pin and slot connections 604 with the framework of the machine. The arms 36 that carry the lower bail rod 25, constitute levers with arms 599 that afford cam-slots 606 whereinto there project rollers 607 that are carried on the aforesaid pivot studs 601. The positions of the rollers 607 as governed by the slots 606 determine the fore and aft position of the links 597 at the various stages in the machine cycle and provide that the faces 608 on the links 597 bear normally on rollers 596 and that upwardly recessed portions 610 in the links 597 are normally slightly spaced above a rest-roller 611, which may be flanged as shown in Figure 1 to keep the link 597 in operative alignment therewith. It will be seen that in the home position of the cycling mechanism the springs 598 are active through the links 597 upon the lower and upper restoring rods 25 for the type-bars to counteract the aggregate tension of the stressed springs 61, 78. The counteracting force being applied to both the lower and upper universal bars 25, it follows that the strain on the long type-bars 10 and their extensions is taken up at two points and reduces the tendency of these bars to flex and bind.

The force of the springs 598 remains active upon the type-bar restoring rods 25 during the initial part of the cycle, but substantially long enough only until the type-bars 10 have risen the equivalent of one unit space, that is until the register wheel driving racks 54, 55, and have assumed lower positions on the type-bars as facilitated by the openings 60 and until the register wheel driving racks 68 and 71 have assumed upper positions with respect to the rear of the levers 75, as facilitated by the loose connections 74. This is illustrated in Figure 3 in which the type-bar 10 and extension 10a have risen the equivalent of about one unit space, and in which the face 608 of the spring load shifters 597 at the next moment will become positioned to the rear of the rollers 596 due to the action of the cams 606 on the rollers 607. As this takes place a more forwardly disposed face 617 on each of the links 597 will come to rest on the rest-roller 611, as seen in Figure 4, and during the remainder of the cycle, except the very last portion thereof, the rollers 596 will ride upwardly in front of the face 608 into a bight 612, the links 597 remaining stationary, and the rollers 607 thereon being in idle contact with a dwell 613 provided at the rear end of the arm. It will be seen that while the spring-load shifters or links 597 are resting upon the rollers 611, the springs 598 are totally idle and in no manner place any load upon the cycling mechanism. This condition prevails until the parts during the return stroke of the cycle near again the position seen in Figure 3. As the cycle progresses still further, the links 597 are forced forwardly under the control of the cams 606 and cause the forward ends of the faces 608 to ride onto the rollers 596 and lift the links 597 off the rest rollers 611 and finally place the recessed portions thereof thereover. This throws the tension of the springs 598 onto the rollers 596 associated with the type-bar restoring mechanism. The latter happenings can be clearly perceived from Figure 3. The work done in shifting the spring tension from the roller 611 to the roller 596 is very little in that the springs 598 in this operation are extended only a little, they having been extended during the very initial phase of the cycle partly by the power of the carry-over springs 61 and 78. In fact, it is apparent that the forces of the springs 598, in being shifted or transplanted onto the rollers 596, assist in turn the restoration of the parts including the type-bars, and the energy lost is merely that which is lost in friction to effect the shift. Preferably the combined power of the two springs 598 is less than the aggregate power of the springs 61, 78, and to assure completion of the cycles, the crank arms 26 of the cycling mechanism, are under the influence of a strong spring 615, see Figures 1 and 2, so oppositely connected to an arm 618 fast on the main rock-shaft 27, and a point on the framework of the machine, that its force will be thrown over center with respect to the shaft 27, to assist and oppose movement of the crank arms 26 in each case as they respectively move to and from their oppositely rocked positions. It will be observed that the springs 598 are being distended during the first part of each cycle and remain so distended for nearly the remainder of the cycle without exerting any load whatever on the cycling mechanism. As the cycle approaches home position, the power of the springs 598 is automatically applied again to counteract the power of the carry-over springs, and the springs 598 will contract until the typebars have moved fully to their home positions. In other words the energy stored in the springs 598 while counteracting the carry-over springs in the initial phase of the cycle, is available and expended to help drive home the parts during the last phase of the cycle.

It will be noted that the load on the cycle mechanism is less than heretofore at the approach of the end of the cycle, and is less variant over the entire cycle. Moreover, the force of the distended transfer springs is counteracted at the beginning of each cycle by the springs 598 substantially for the exact phase of the cycle only when the transfer springs exert a load changing force on the cycling mechanism. It will also be seen that the overload clutch hereinbefore described can perform its intended function for all phases of the cycle. Also, the load variations during the cycle being low, the friction in said clutch can be adjusted to provide for soft pick-up of the load at the start of each cycle.

It is to be understood that the invention is susceptible of modification and change, and comprehends other structures and details without departing from the substance or spirit of the invention.

What is claimed is:

1. In a machine of the class described, the combination with register wheels, of reciprocatory means for driving said wheels, means including machine cycling means to reciprocate said reciprocatory means variably predeterminable extents, transfer provisions including carry-over springs exerting usually towards conclusion of each reciprocation of the reciprocatory means, collectively a strong retarding force on the latter, and exerting during an initial part of each reciprocation collectively a strong advancing force on the reciprocatory means, and means to counteract said forces at least partly, comprising, spring-means, and means to render said spring-means counteractingly effective substantially only for the period said carry-over springs exert said forces on said reciprocatory means.

2. In a machine of the class described having register wheels, reciprocatory actuators for the register wheels, means including machine cycling means to reciprocate said actuators variably predeterminable extents, said reciprocating means including a reciprocatory cycle-operated universal member cooperative with the actuators for driving them for the return part of their reciprocations, transfer means for the register wheels, capable of being spring-loaded by the actuators as they complete their reciprocations, said means when spring-loaded exerting forces on said actuators tending to start them on new reciprocations, spring means for acting on said universal member in a direction counter to that of the spring-loaded transfer means on the actuators, and means controlled by the cycling means to cast the force of said spring means on said universal member as each machine cycle nears its conclusion, and to cast it off said universal member at the beginning of the succeeding cycle after an initial reciprocatory movement of the actuator has taken place.

3. In a machine of the class described having a register comprising a plurality of order wheels, and having means to run amounts into said register, the combination with machine cycling means, of separate resilient means associated with the individual register wheels to transmit carrying operations thereto, an operating member universal to said resilient means, and controlled by the cycling means to move in one direction during an initial phase of the cycle and to move in opposite direction during an end-phase of the cycle, thereby to act on all said resilient means for transmitting carrying operations, devices associated with and controlled by said wheels to permit or to block carrying operations of the separate resilient means in accordance with carrying operations called for, the separate resilient means being idly yielding when blocked, and spring means controlled by the cycling means to place transitorily on said universal member, towards the end of each cycle, and for the initial phase of the next cycle, a spring force which is opposing at least in part the aggregate forces which may be exerted on said universal member by the blocked resilient means at each initial phase of the machine cycle.

4. In a machine of the class described, a plurality of register wheels, a series of reciprocatory actuator means for said wheels, means including machine cycling means to reciprocate said actuator means variably predeterminable extents, means to render said actuator means effective on the wheels only during the return part of their reciprocation, each of said actuator means comprising, driver means for a register wheel, and means including a spring to provide that said driver means may be stopped in advance of the complete reciprocation of the remainder of the actuator means, means controlled by said wheels in accordance with carrying operations called for, to stop such of the driver means in advance of the remainder of the actuator means which are not to impart a transfer operation to a register wheel, the various driver means that are not stopped by the stopping means imparting transfer operations to their associated wheels due to greater travel, and the springs of such driver means as are stopped in advance, exerting resilient forces to start the actuator means on new reciprocations upon completion of each cycle, and resilient means controlled by the cycling means to place transitorily on said actuator means, at the end of each cycle, and for an initial part of the next cycle, a resilient force opposing to that of the springs which tend to start said actuator means on new reciprocations.

5. In a machine of the class described, a plurality of register wheels, a series of reciprocatory actuator means for said wheels, means including machine cycling means to reciprocate said actuator means variably predeterminable extents, means to render said actuator means effective on the wheels only during the return part of their reciprocation, each of said actuator means comprising, driver means for a register wheel, and means including a spring to provide that said driver means may be stopped in advance of the complete reciprocation of the remainder of the actuator means, means controlled by said wheels in accordance with carrying operations called for, to stop such of the driver means in advance of the remainder of the actuator means which are not required to impart a transfer operation to a register wheel, the various driver means that are not stopped by the stopping means, imparting transfer operations to their associated wheels due to greater travel, and the springs of such driver means as are stopped in advance, exerting resilient forces to start the actuator means on new reciprocations upon completion of each cycle, resilient means controlled by the cycling means to place transitorily on said actuator means, at the end of each cycle, and for an initial part of the next cycle, a resilient force opposing to that of the springs which tend to start said actuator means on new reciprocations, and over-center spring means associated with the cycling means to urge it with increasing force toward full cycle position as each cycle nears conclusion, and to oppose with diminishing force the movement of the cycling means as each cycle gets underway.

6. In a machine of the class described having register wheels and reciprocally movable differential actuators for said wheels, means to operate said actuators differentially and subsequently to restore them to normal positions, said means comprising a universal member and machine cycling means to operate said member in one direction to cause differential actuations of said actuators, and to operate said member in the other direction to restore said actuators to normal positions and hold them there, transfer springs resisting the last-part restoring movement of said member, and conversely tending to speed-up said member during its initial operating movement, resilient means normally exerting tension on said member to oppose movement of the latter from normal position, rest means on the frame for said resilient means to bear against idly with tension, and means to cause said resilient means to shift its tension from said member to said rest means as said member completes an initial operating movement, and to cause said resilient means to shift its tension back to the member just before said member executes a last-part restoring movement, said resilient means in the last-part restoring movement of said member expending stored energy to assist movement of said member, and said resilient means in the initial operating movement of said member storing energy and resisting movement of said member.

7. In a machine of the class described having register wheels and reciprocally movable differential actuators for said wheels, means to operate said actuators differentially and subsequently to restore them to normal positions, said means comprising a universal member and machine cycling means to operate said member in one direction to cause differential actuations of said actuators, and to operate said member in the other direction to restore said actuators to normal positions and hold them there, transfer springs resisting the last-part restoring movement of said member, and conversely tending to speed-up said member during its initial operating movement, resilient means normally exerting tension on said member to oppose movement of the latter from normal position, rest means on the frame for said resilient means to bear against idly with tension, and means controlled by said member as it completes initial operating movement to cause said resilient means to shift its tension from said member to said rest means, and controlled by said member as it nears restored position to cause said resilient means to shift its tension from said rest means to said member, said resilient means in a last-part restoring movement of said member expending stored energy to assist movement of said member, and said resilient means in the initial operating movement of said member storing energy to resist movement of said member.

8. In a machine of the class described having register wheels and reciprocally movable differential actuators for said wheels, means to operate said actuators differentially and subsequently to restore them to normal positions, said means comprising a universal member and machine cycling means to operate said member in one direction to cause differential actuations of said actuators, and to operate said member in the other direction to restore said actuators to normal positions and hold them there, transfer springs resisting the last-part restoring movement of said member, and conversely tending to speed-up said member during its initial operating movement, a resiliently active device, means operatively associated with said member and normally engaged by said resiliently active device for the latter to oppose resiliently movement of said member from said normal position, rest means on the frame for said resiliently active device to bear against idly, and cycle-controlled means operative after an initial operating movement of said member to cause said resiliently active device to shift from the normally engaged means onto said rest means, and operative as said member nears said restored position to cause said resiliently active device to shift from said rest means back to said normally engaged means, said resilient means in a last-part restoring movement of said member expending stored energy to assist movement of said member, and said resilient means in the initial operating movement of said member storing energy to resist movement of said member.

9. In a machine of the class described, having at least two sets of register wheels, common reciprocatory actuators for the register wheels of both sets, said actuators having considerable length and the sets of register wheels being at different locations spaced lengthwise of the actuators, means including machine cycling means to reciprocate said actuators variably predeterminable extents, said reciprocating means including two cycle-operated universal members cooperative with the actuators at different locations therealong for driving them for the return part of their reciprocations, transfer means for each set of register wheels, each transfer means capable of being spring-loaded by said actuators as the latter complete their reciprocations, each said transfer means when spring-loaded exerting resilient forces on said actuators tending to start them on new reciprocations, and means including resilient means controlled by the cycling means to apply transitorily to both said universal members at the end of each cycle, and for an initial part of the next cycle, a force counter to that of the spring-loaded transfer means on the actuators.

WALTER A. ANDERSON.

No references cited.